US012761340B2

(12) United States Patent
Sulkowski et al.

(10) Patent No.: US 12,761,340 B2
(45) Date of Patent: Oct. 13, 2026

(54) RADAR SYSTEM AND METHOD FOR RADAR SYSTEM

(71) Applicant: Carrier Corporation, Palm Beach Gardens, FL (US)

(72) Inventors: Lukasz Sulkowski, Marszewska Kolonia (PL); Tomasz Cegielski, Rumia (PL); Tadeusz Milek, Warsaw (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 201 days.

(21) Appl. No.: 18/883,005

(22) Filed: Sep. 12, 2024

(65) Prior Publication Data

US 2025/0093488 A1 Mar. 20, 2025

Related U.S. Application Data

(60) Provisional application No. 63/583,366, filed on Sep. 18, 2023.

(51) Int. Cl.
*G01S 13/526* (2006.01)
*G01S 7/282* (2006.01)

(52) U.S. Cl.
CPC ............ *G01S 13/526* (2013.01); *G01S 7/282* (2013.01)

(58) Field of Classification Search
CPC ........ G01S 13/50; G01S 13/526; G01S 7/282; G01S 7/2923
See application file for complete search history.

(56) References Cited

U.S. PATENT DOCUMENTS

| | | | | |
|---|---|---|---|---|
| 5,805,110 A * | 9/1998 | McEwan | G01S 13/18 342/126 |
| 2014/0024917 A1* | 1/2014 | McMahon | A61B 5/1126 600/407 |
| 2016/0011300 A1* | 1/2016 | Lee | G01S 13/524 342/127 |

(Continued)

FOREIGN PATENT DOCUMENTS

WO 2018033574 A1 2/2018

OTHER PUBLICATIONS

European Search Report for Application No. 24197097.9, Issued Feb. 12, 2025, 9 Pages.

*Primary Examiner* — Peter M Bythrow
(74) *Attorney, Agent, or Firm* — CANTOR COLBURN LLP

(57) ABSTRACT

A radar system and a method for a radar system configured with a gating mechanism is disclosed. The method includes determining, by a computing device, one or more first pulse attributes related to a first set of reflected electromagnetic pulses during a first period of time. The method further includes operating, by the computing device, a modulator to append a modulated signal to a set of emitted electromagnetic pulses. The method further includes determining, by the computing device, one or more second pulse attributes related to a second set of reflected electromagnetic pulses during a second period of time. The method further includes determining, by the computing device, based on the one or more first and second pulse attributes, a change of position of the object within the FOV of the radar system during a period between the first period of time and the second period of time.

18 Claims, 3 Drawing Sheets

(56) References Cited

U.S. PATENT DOCUMENTS

| | | | | |
|---|---|---|---|---|
| 2018/0239014 | A1* | 8/2018 | Mcmahon | H03B 5/187 |
| 2020/0191940 | A1* | 6/2020 | Wu | G01S 13/931 |
| 2021/0063555 | A1* | 3/2021 | Ertem | G01S 13/10 |
| 2021/0293946 | A1* | 9/2021 | Kishigami | G01S 7/0234 |
| 2021/0333383 | A1* | 10/2021 | Brown | G01S 13/42 |
| 2021/0389452 | A1* | 12/2021 | Lau | G01S 13/347 |
| 2024/0077599 | A1* | 3/2024 | Moss | G01S 13/536 |

* cited by examiner

RADAR SYSTEM AND METHOD FOR RADAR SYSTEM

CROSS-REFERENCE TO RELATED APPLICATION

This patent application claims the benefit of U.S. Provisional Patent Application No. 63/583,366, filed on Sep. 18, 2023, which is incorporated by reference herein in its entirety.

TECHNICAL FIELD

This invention relates to operation of a radar system, and more particularly, to detecting change in position of objects within a field of view of a radar system.

BACKGROUND

Generally, in radar systems, such as Doppler radar systems, a set of emitted electromagnetic (EM) pulses may strike an object in a field of view (FOV) of the radar system and be reflected. A receiver of the radar system may receive a set of reflected EM pulses. If the object has a velocity relative to the radar system, the set of reflected EM pulses may be shifted by the Doppler effect, relative the set of emitted EM pulses. The Doppler effect may be used to determine the relative velocity of the object.

However, in some instances, a stationary object may be large, and may be placed such that it partially or completely occludes the FOV of the radar system. Further, in some other instances, in the event that a small object may be placed close to the receiver to partially or fully occlude receiver. At this juncture, the radar system may not be able to determine if any movement is occurring behind the object.

In an example, the radar system (such as the Doppler radar system) may be used for purposes of security in a FOV. The radar system may detect movement into and out of the FOV but may not register if an object within the FOV was newly placed, or moved a little.

SUMMARY

Disclosed herein is a radar system configured with a range gating mechanism. The radar system includes a transmitter configured to emit a set of electromagnetic pulses in a region defining a field of view (FOV) of the radar system. The radar system further includes a receiver configured to detect a set of reflected electromagnetic pulses originating responsive to reflection of the set of emitted electromagnetic pulses from an object located within the FOV of the radar system. The radar system further includes a modulator communicably coupled to the transmitter and configured to selectively append a modulated signal to the set of emitted electromagnetic pulses. The radar system further includes a computing device communicably coupled to the transmitter, the receiver, and the modulator. The computing device is configured to determine one or more first pulse attributes related to a first set of reflected electromagnetic pulses during a first period of time. The computing device is further configured to operate the modulator to append a modulated signal to the set of emitted electromagnetic pulses. The computing device is further configured to determine one or more second pulse attributes related to a second set of reflected electromagnetic pulses during a second period of time. The computing device is further configured to determine, based on the one or more first and second pulse attributes, a change of position of the object within the FOV of the radar system during a period between the first period of time and the second period of time.

In one or more embodiments, the computing device is configured to intermittently operate the modulator to append the modulated signal to the set of emitted electromagnetic pulses.

In one or more embodiments, the computing device is configured to operate the modulator to continuously append the modulated signal to the set of emitted electromagnetic pulses.

In one or more embodiments, the one or more pulse attributes include one or more of an amplitude of the set of reflected electromagnetic pulses, and a phase difference between the corresponding set of emitted electromagnetic pulses and the set of reflected electromagnetic pulses.

In one or more embodiments, the computing device is further configured to determine, a first amplitude of the first set of reflected electromagnetic pulses. The computing device is further configured to determine a second amplitude of the second set of reflected electromagnetic pulses. The computing device is further configured to determine the change in position of the object based on the first and second amplitudes.

In one or more embodiments, the modulated signal is a frequency modulated signal.

In one or more embodiments, the first and second sets of reflected electromagnetic pulses are transformed in frequency domain using any one or a combination of filtering, convolution, and autocorrelation.

In one or more embodiments, the computing device is configured to operate the modulator to append the modulated signal to the set of emitted electromagnetic pulses during any one period of time, such that the modulated signal during the any one period of time includes at least first and second frequencies different from each other.

In one or more embodiments, the first and second sets of reflected electromagnetic pulses are filtered in the frequency domain, and wherein a frequency difference of the modulated signal is in a passband.

Further disclosed herein is a method for a radar system configured with a range gating mechanism. The method includes determining, by a computing device, one or more first pulse attributes related to a first set of reflected electromagnetic pulses during a first period of time. The method further includes operating, by the computing device, a modulator to append a modulated signal to a set of emitted electromagnetic pulses. The method further includes determining, by the computing device, one or more second pulse attributes related to a second set of reflected electromagnetic pulses during a second period of time. The method further includes determining, by the computing device, based on the one or more first and second pulse attributes, a change of position of the object within the FOV of the radar system during a period between the first period of time and the second period of time.

In one or more embodiments, the method includes operating intermittently, by the computing device, the modulator to append the modulated signal to the set of emitted electromagnetic pulses.

In one or more embodiments, the method includes operating, by the computing device, the modulator to continuously append the modulated signal to the set of emitted electromagnetic pulses.

In one or more embodiments, the one or more pulse attributes includes one or more of an amplitude of the set of reflected electromagnetic pulses, and a phase difference between the corresponding set of emitted electromagnetic pulses and the set of reflected electromagnetic pulses.

In one or more embodiments, the method further includes determining, by the computing device, a first amplitude of the first set of reflected electromagnetic pulses. The method further includes determining, by the computing device, a second amplitude of the second set of reflected electromagnetic pulses. The method further includes determining, by the computing device, the change in position of the object based on the first and second amplitudes.

In one or more embodiments, the modulated signal is a frequency modulated signal.

In one or more embodiments, the first and second sets of reflected electromagnetic pulses are transformed in frequency domain using any one or a combination of filtering, convolution, and autocorrelation.

In one or more embodiments, the method further includes operating, by the computing device, the modulator to append the modulated signal to the set of emitted electromagnetic pulses during any one period of time, such that the modulated signal during the any one period of time includes at least first and second frequencies different from each other.

In one or more embodiments, the first and second sets of reflected electromagnetic pulses are filtered in the frequency domain, and wherein a frequency difference of the modulated signal is in a passband.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention, described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components.

Figure 1:
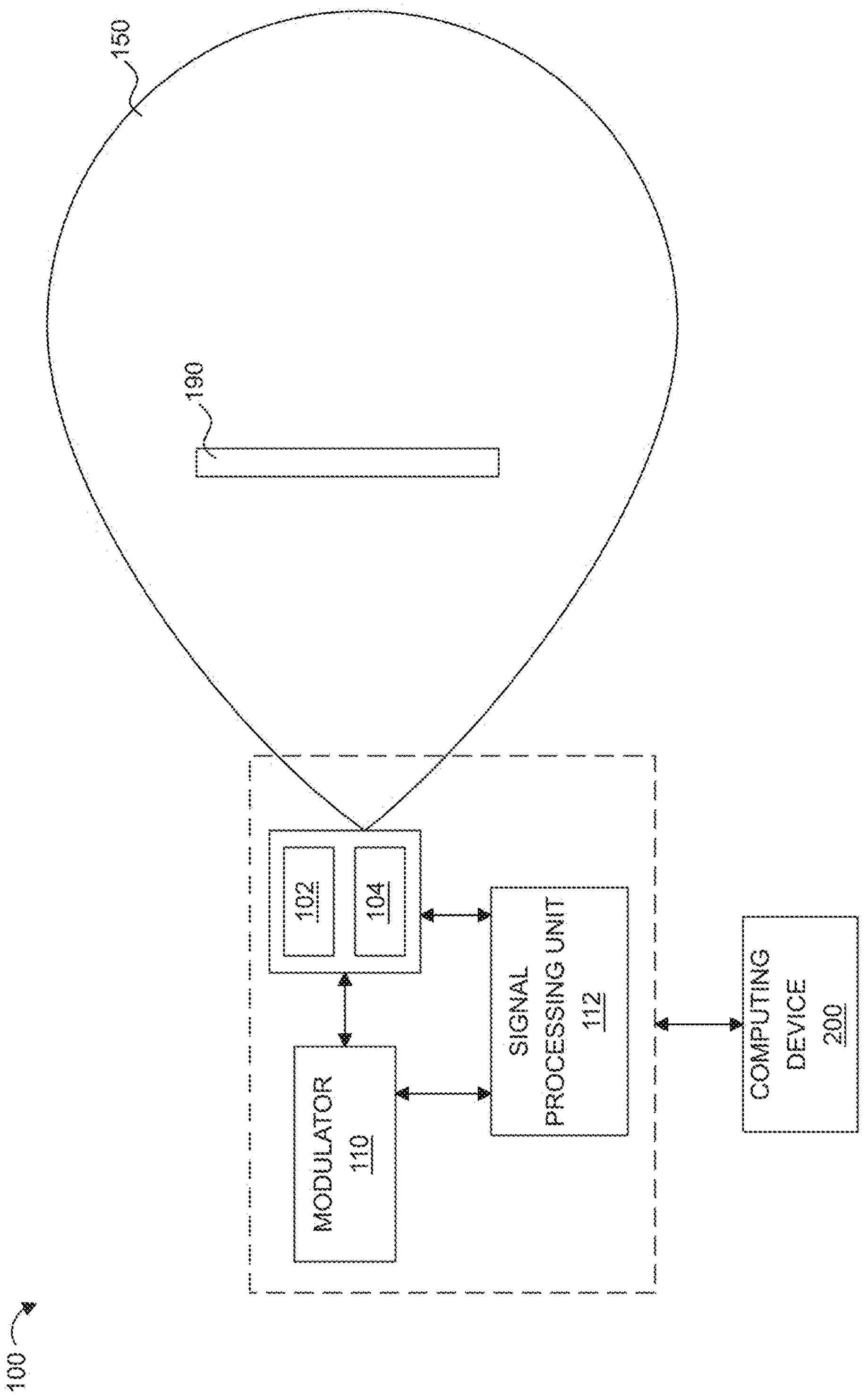
FIG. 1 is a schematic representation of a radar system and a field of view of the radar system, in accordance with one or more embodiments of the invention.

Referring to FIG. 1, a schematic representation of a radar system 100 along with a field of view (FOV) 150 of the radar system 100 is shown. The radar system 100 may be configured with a range gating mechanism. The radar system 100 includes a transmitter 102 and a receiver 104. The transmitter 102 is configured to emit a set of electromagnetic (EM) pulses in a region defining the FOV 150 of the radar system 100. The receiver 104 is configured to detect a set of reflected EM pulses. The set of reflected EM pulses may originate responsive to the set of emitted EM pulses reflecting off of an object 190 located within the FOV 150. The receiver 104 may further be configured to generate a signal responsive to receiving a set of reflected EM pulses.

In one or more embodiments, the radar system 100 may be a Doppler radar system. Generally, a set of emitted EM pulses may strike an object in a FOV of the radar system and be reflected. A receiver of the radar system may receive the set of reflected EM pulses. If the object has a velocity relative to the radar system, the set of reflected EM pulses is shifted by the Doppler effect, relative the set of emitted EM pulses. The Doppler effect may be used to determine the relative velocity of the object.

However, in some instances, a stationary object may be large, and may be placed, such that it partially or completely occludes the FOV of the radar system. Further, in some other instances, in the event that a small object may be placed close to the receiver to partially or fully occlude receiver. At this juncture, the radar system may not be able to determine if any movement is occurring behind the object.

In an example, the radar system (such as the Doppler radar system) may be used for purposes of security in a FOV. The radar system may detect movement into and out of the FOV but may not register if an object within the FOV was newly placed, or moved a little.

Thus, there is a requirement for a means to determine, using the radar system, presence or relocation of an object, and location or distance of the object relative to the radar system. Further, preferably, the means may be cost effective, and be capable of being integrated into existing radar systems without a requirement for significant modifications of the existing radar systems.

In continued reference to FIG. 1, the radar system 100 further includes a modulator 110 communicably coupled to the transmitter 102. The modulator 110 is configured to selectively append a modulated signal to the set of emitted EM pulses from the transmitter 102. In one or more embodiments, the modulated signal may be a frequency modulated signal.

The radar system 100 may further include a signal processing unit 112 communicably coupled to the transmitter 102, the receiver 104, and the modulator 110. The signal processing unit 112 may be configured to receive signals generated by the receiver 104 over a plurality of successive periods of time. The signal processing unit 112 may be further configured to generate corresponding electric voltages in response to received signals. In one or more embodiments, the electric voltages are direct current (DC) voltages. In some other embodiments, the electric voltages are alternating current (AC) voltages. The generated electric voltages may have a magnitude that is based on one or more pulse attributes of the respective received signals from the receiver 104. In one or more embodiments, the one or more pulse attributes may include one or more of an amplitude of the set of reflected EM pulses, and a phase difference between the corresponding set of emitted EM pulses and the set of reflected EM pulses. In one or more embodiments, the one or more pulse attributes may be indicative of a distance of the object 190 from the radar system 100.

The radar system 100 further includes a computing device 200. The computing device 200 may be configured for operating the radar system 100. The computing device 200 may be implemented by way of a single device or a combination of multiple devices that may be communicably coupled or networked together. The computing device 200 may be implemented in hardware or a suitable combination of hardware and software. The computing device 200 may be a hardware device including a processor executing machine-readable program instructions. The "hardware" may include a combination of discrete components, an integrated circuit, an application-specific integrated circuit, a field programmable gate array, a digital signal processor, or other suitable hardware. The "software" may include one or more objects, agents, threads, lines of code, subroutines, separate software applications, two or more lines of code or other suitable software structures operating in one or more software applications or on one or more processors. The processor may include, for example, without limitations, microprocessors, microcomputers, microcontrollers, digital signal processors, central processing units, state machines, logic circuits, any devices that manipulate data or signals based on operational instructions, and the like. Among other capabilities, the processor may fetch and execute computer-readable instructions in the memory operationally coupled with the computing device 200 for performing tasks such as data processing, input/output processing, feature extraction, and/or any other functions. Any reference to a task in the present disclosure may refer to an operation being or that may be performed on data.

The radar system 100 may further include units, such as, without limitations, a display unit, an audio unit, a notification unit, an input unit, an output unit, and the like; however, the same are not shown in the FIG. 1, for the purpose of clarity.

Figure 2:
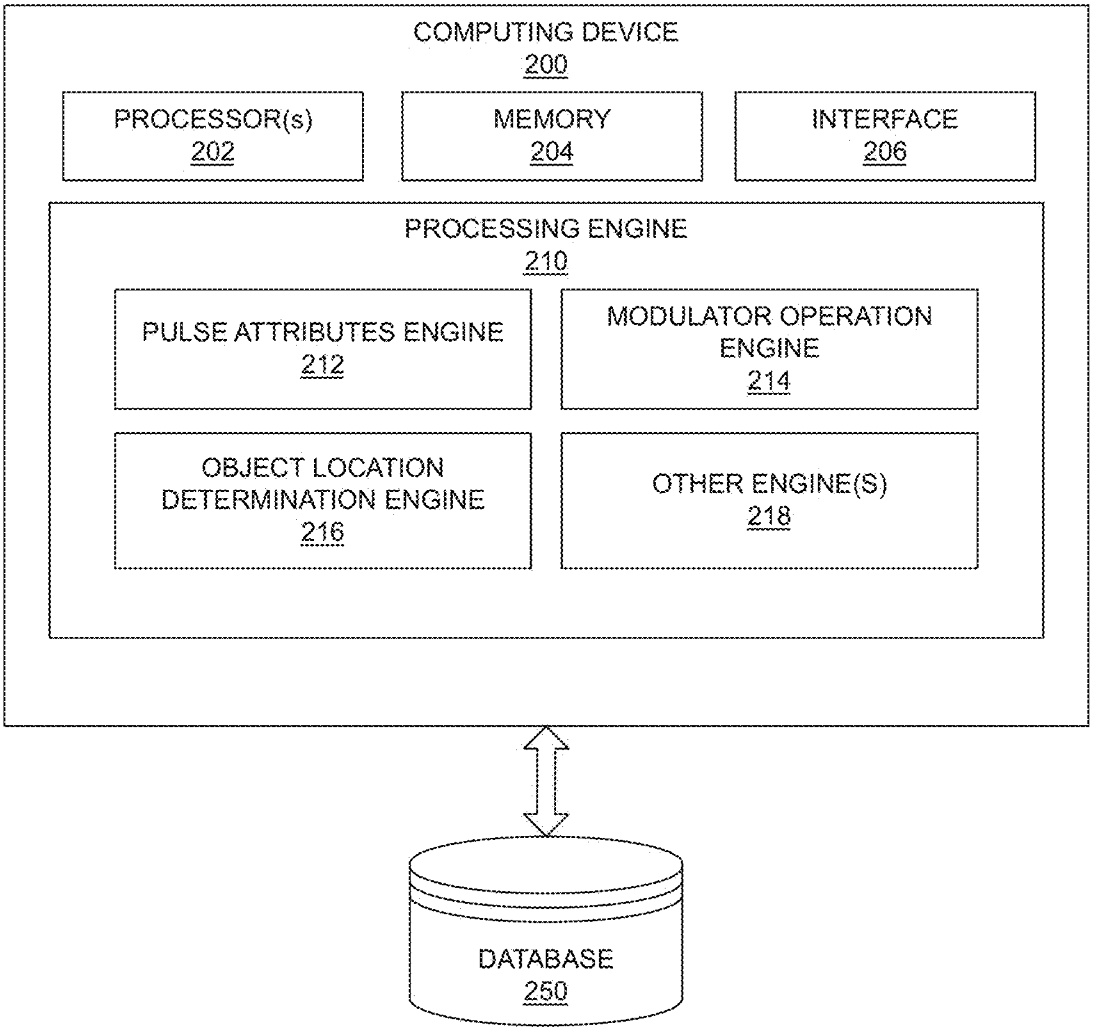
FIG. 2 is a detailed schematic block diagram of a computing device of the radar system of FIG. 1, in accordance with one or more embodiments of the invention.

Referring to FIG. 2, a detailed schematic block diagram of the computing device 200 is shown. The computing device 200 includes a processor 202, and a memory 204 communicably coupled to the processor 202. The memory 204 may store instructions executable by the processor 202 to implement the computing device 200. The computing device 200 further includes an interface 206. The interface 206 may include a variety of interfaces, for example, interfaces for data input and output devices, referred to as I/O devices, storage devices, and the like. The interface 206 may also provide a communication pathway for one or more components of the computing device 200. The computing device 200 is communicably coupled to a database 250. The database 250 may be configured to store data generated during execution of instructions by the processor 202 in order to implement the computing device 200. The database 250 may further be configured to store additional data required for implementing the computing device 200.

Referring now to FIGS. 1 and 2, in one or more embodiments, the computing device 200 includes a processing engine 210. The processing engine 210 may be implemented as a combination of hardware and programming (for example, programmable instructions) to implement one or more functionalities of the processing engine 210. In some examples, the processing engine 210 may be implemented by electronic circuitry.

The processing engine 210 may include a pulse attributes engine 212, modulator operation engine 214, an object location determination engine 216, and other engine(s) 218. The other engine(s) 218 may include engines configured to perform one or more functions ancillary functions associated with the processing engine 210.

The pulse attributes engine 212 may be configured to determine one or more first pulse attributes related to a first set of reflected EM pulses during a first period of time. In one or more embodiments, the pulse attributes engine 212 may be configured to determine a first amplitude of the first set of reflected EM pulses.

The modulator operation engine 214 may be configured to operate the modulator 110 to append a modulated signal to the set of emitted EM pulses emitted by the transmitter 102. In one or more embodiments, the modulator operation engine 212 may be configured to intermittently operate the modulator 110 to append the modulated signal to the set of emitted EM pulses. In one or more embodiments, the modulator operation engine 212 may be configured to selectively operate the modulator 110 to append the modulated signal to the set of emitted EM pulses during at least first and second periods of time, where the second period of time succeeds the first period of time. In some other embodiments, the modulator operation engine 212 may be configured to operate the modulator 110 to continuously append the modulated signal to the set of emitted EM pulses.

The pulse attributes engine 212 may be configured to determine one or more second pulse attributes related to a first set of reflected EM pulses during the second period of time. In one or more embodiments, the pulse attributes engine 212 may be configured to determine a second amplitude of the second set of reflected EM pulses.

The object location determination engine 216 may be configured to determine, based on the first and second pulse attributes, a change in position of the object 190 within the FOV 150 of the radar system 100 during a period between the first and second periods of time. In one or more embodiments, the object location determination engine 216 may be configured to determine based on the first and second amplitudes.

In one or more embodiments, the object location determination engine 216 may be configured to determine that the location of the object 190 during the first and second periods of time is substantially similar if the first and second amplitudes are substantially similar. In one or more embodiments, the object location determination engine 216 may be configured to determine that the location of the object 190 during the first and second periods of time is different if the first and second amplitudes are different.

In one or more embodiments, the modulator operation engine 214 may be configured to operate the modulator 110 to append the modulated signal to the set of emitted EM pulses during any one period of time, such that the modulated signal during any one period of time includes at least first and second frequencies different from each other.

In one or more embodiments, the pulse attributes engine 212 may be configured to determine one or more third pulse attributes related to the set of emitted EM pulses appended with the modulated signal having at least first and second frequencies. In one or more embodiments, the pulse attributes engine 212 may be configured to determine a third amplitude of set of emitted EM pulses appended with the modulated signal having at least first and second frequencies.

In one or more embodiments, the object location determination engine 216 may be configured to determine a distance of the object 190 from the receiver 104 of the radar system 100 based on the third amplitude.

Figure 3:
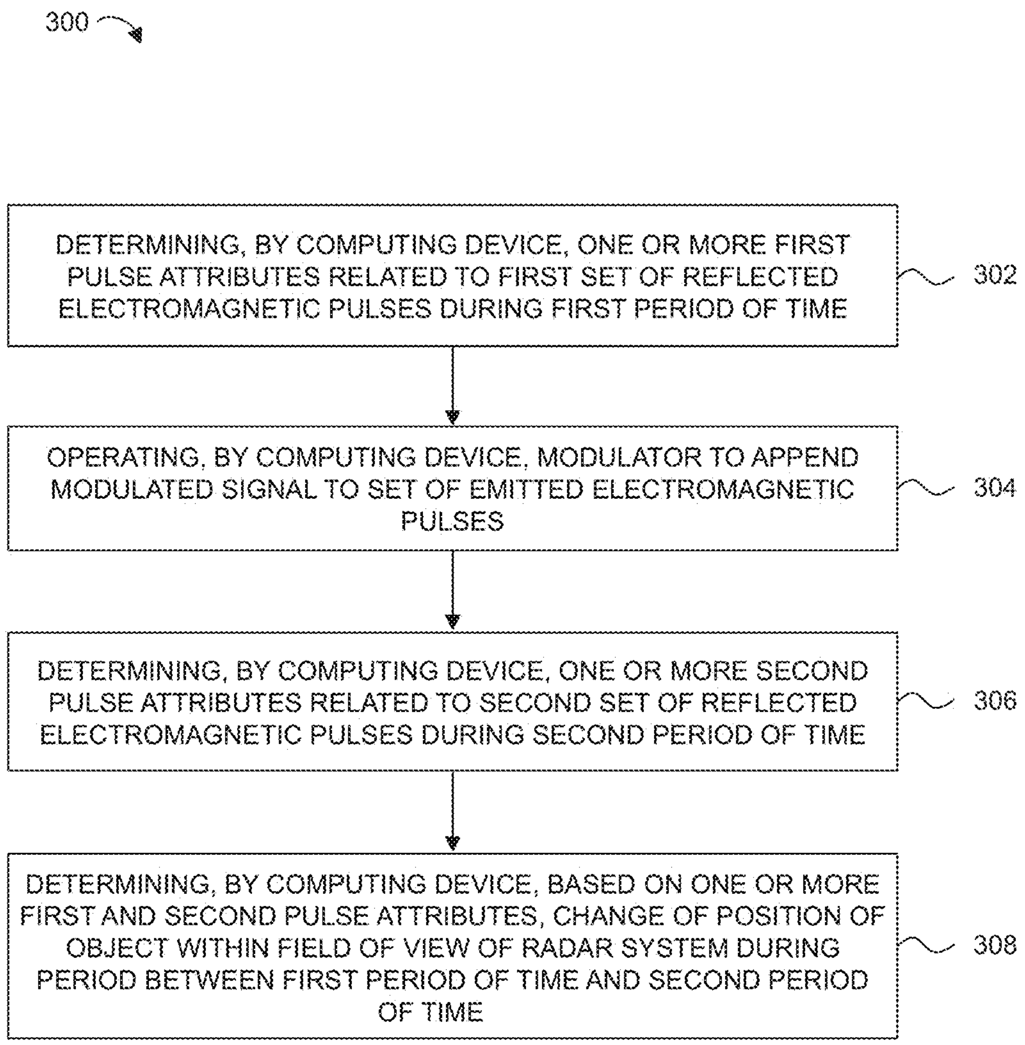
FIG. 3 is a schematic flow diagram for a method for the radar system of FIG. 1, in accordance with one or more embodiments of the invention.

Referring to FIG. 3, a schematic flow diagram for a method 300 for the radar system 100 is shown. Referring now to FIGS. 1 to 3, at step 302, the method 300 includes determining, by the computing device 200, one or more first pulse attributes related to the first set of reflected EM pulses during the first period of time. At step 304, the method 300 further includes operating, by the computing device 200, the modulator 110 to append the modulated signal to the set of emitted EM pulses. At step 306, the method 300 further includes determining, by the computing device 200, one or more second pulse attributes related to the second set of reflected EM pulses during the second period of time. At step 308, the method 300 further includes determining, by the computing device 200, based on the one or more first and second pulse attributes, a change of position of the object 190 within the FOV 150 of the radar system 100 during the period between the first period of time and the second period of time.

In one or more embodiments, the method 300 includes operating intermittently, by the computing device 200, the modulator 110 to append the modulated signal to the set of emitted EM pulses.

In one or more embodiments, the method 300 includes operating, by the computing device 200, the modulator 110 to continuously append the modulated signal to the set of emitted EM pulses.

In one or more embodiments, the method 300 further includes determining, by the computing device 200, the first amplitude of the first set of reflected EM pulses. The method 300 further includes determining, by the computing device 200, the second amplitude of the second set of reflected EM pulses. The method 300 further includes determining, by the computing device 200, the change in position of the object 190 based on the first and second amplitudes.

In one or more embodiments, the method 300 further includes operating, by the computing device 200, the modulator 110 to append the modulated signal to the set of emitted EM pulses during any one period of time, such that the modulated signal during the any one period of time includes at least first and second frequencies different from each other.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A radar system configured with a range gating mechanism, comprising:

- a transmitter configured to emit a set of electromagnetic pulses in a region defining a field of view (FOV) of the radar system;
- a receiver configured to detect a set of reflected electromagnetic pulses originating responsive to reflection of the set of emitted electromagnetic pulses from an object located within the FOV of the radar system;
- a modulator communicably coupled to the transmitter and configured to selectively append a modulated signal to the set of emitted electromagnetic pulses; and
- a computing device communicably coupled to the transmitter, the receiver, and the modulator, the computing device configured to:
  - determine one or more first pulse attributes related to a first set of reflected electromagnetic pulses during a first period of time;
  - operate the modulator to append a modulated signal to the set of emitted electromagnetic pulses;
  - determine one or more second pulse attributes related to a second set of reflected electromagnetic pulses during a second period of time; and
  - determine, based on the one or more first and second pulse attributes, a change of position of the object within the FOV of the radar system during a period between the first period of time and the second period of time.

2. The radar system of claim 1, wherein the computing device is configured to intermittently operate the modulator to append the modulated signal to the set of emitted electromagnetic pulses.

3. The radar system of claim 1, wherein the computing device is configured to operate the modulator to continuously append the modulated signal to the set of emitted electromagnetic pulses.

4. The radar system of claim 1, wherein the one or more pulse attributes comprise one or more of an amplitude of the set of reflected electromagnetic pulses, and a phase difference between the corresponding set of emitted electromagnetic pulses and the set of reflected electromagnetic pulses.

5. The radar system of claim 1, wherein the computing device is further configured to:

- determine, a first amplitude of the first set of reflected electromagnetic pulses; and
- determine a second amplitude of the second set of reflected electromagnetic pulses; and determine the change in position of the object based on the first and second amplitudes.

6. The radar system of claim 1, wherein the modulated signal is a frequency modulated signal.

7. The radar system of claim 1, wherein the first and second sets of reflected electromagnetic pulses are transformed in frequency domain using any one or a combination of filtering, convolution, and autocorrelation.

8. The radar system of claim 1, wherein the computing device is configured to operate the modulator to append the modulated signal to the set of emitted electromagnetic pulses during any one period of time, such that the modulated signal during the any one period of time comprises at least first and second frequencies different from each other.

9. The radar system of claim 1, wherein the first and second sets of reflected electromagnetic pulses are filtered in the frequency domain, and wherein a frequency difference of the modulated signal is in a passband.

10. A method for a radar system configured with a range gating mechanism, comprising:

determining, by a computing device, one or more first pulse attributes related to a first set of reflected electromagnetic pulses during a first period of time;

operating, by the computing device, a modulator to append a modulated signal to a set of emitted electromagnetic pulses;

determining, by the computing device, one or more second pulse attributes related to a second set of reflected electromagnetic pulses during a second period of time; and determining, by the computing device, based on the one or more first and second pulse attributes, a change of position of the object within the FOV of the radar system during a period between the first period of time and the second period of time.

11. The method of claim 10, further comprising operating intermittently, by the computing device, the modulator to append the modulated signal to the set of emitted electromagnetic pulses.

12. The method of claim 10, further comprising operating, by the computing device, the modulator to continuously append the modulated signal to the set of emitted electromagnetic pulses.

13. The method of claim 10, wherein the one or more pulse attributes comprise one or more of an amplitude of the set of reflected electromagnetic pulses, and a phase difference between the corresponding set of emitted electromagnetic pulses and the set of reflected electromagnetic pulses.

14. The method of claim 10, further comprising:

determining, by the computing device, a first amplitude of the first set of reflected electromagnetic pulses; and determining, by the computing device, a second amplitude of the second set of reflected electromagnetic pulses; and determining, by the computing device, the change in position of the object based on the first and second amplitudes.

15. The method of claim 10, wherein the modulated signal is a frequency modulated signal.

16. The method of claim 10, wherein the first and second sets of reflected electromagnetic pulses are transformed in frequency domain using any one or a combination of filtering, convolution, and autocorrelation.

17. The method of claim 10, further comprising operating, by the computing device, the modulator to append the modulated signal to the set of emitted electromagnetic pulses during any one period of time, such that the modulated signal during the any one period of time comprises at least first and second frequencies different from each other.

18. The method of claim 10, wherein the first and second sets of reflected electromagnetic pulses are filtered in the frequency domain, and wherein a frequency difference of the modulated signal is in a passband.

* * * * *